United States Patent [19]

Romanowski

[11] 4,074,696

[45] Feb. 21, 1978

[54] PRESSURE RELIEF VALVE OPERATION SIGNAL

[75] Inventor: Robert F. Romanowski, Rochester, N.Y.

[73] Assignee: Qualitrol Corporation, Fairport, N.Y.

[21] Appl. No.: 735,422

[22] Filed: Oct. 26, 1976

[51] Int. Cl.² ............................................. F16K 37/00
[52] U.S. Cl. .................................... 137/553; 137/557; 137/541
[58] Field of Search ............... 137/553, 557, 541, 377; 116/125

[56] References Cited

U.S. PATENT DOCUMENTS

| | | | |
|---|---|---|---|
| 2,357,059 | 9/1944 | Ray | 116/125 |
| 2,506,737 | 5/1950 | Paquin | 137/377 X |
| 2,744,535 | 5/1956 | Baldwin, Jr. | 137/377 |
| 3,251,336 | 5/1966 | O'Brien | 137/553 X |
| 3,772,624 | 11/1973 | Keogh | 137/541 X |
| 3,828,812 | 8/1974 | Read | 137/541 X |

*Primary Examiner*—William R. Cline
*Attorney, Agent, or Firm*—Stephen J. Rudy

[57] ABSTRACT

An indicator to show that a pressure relief device has operated. The indicator of the invention comprises a flexed spring which is released to move to an upright position when the pressure relief valve is caused to operate.

2 Claims, 3 Drawing Figures

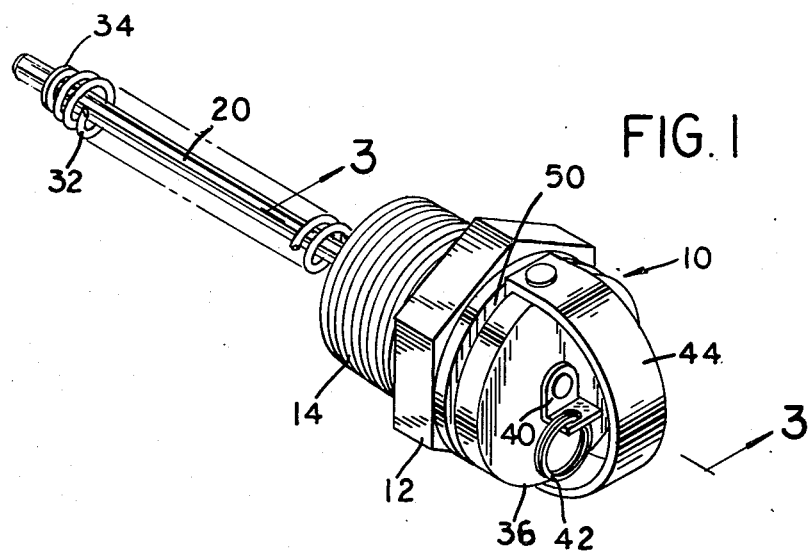
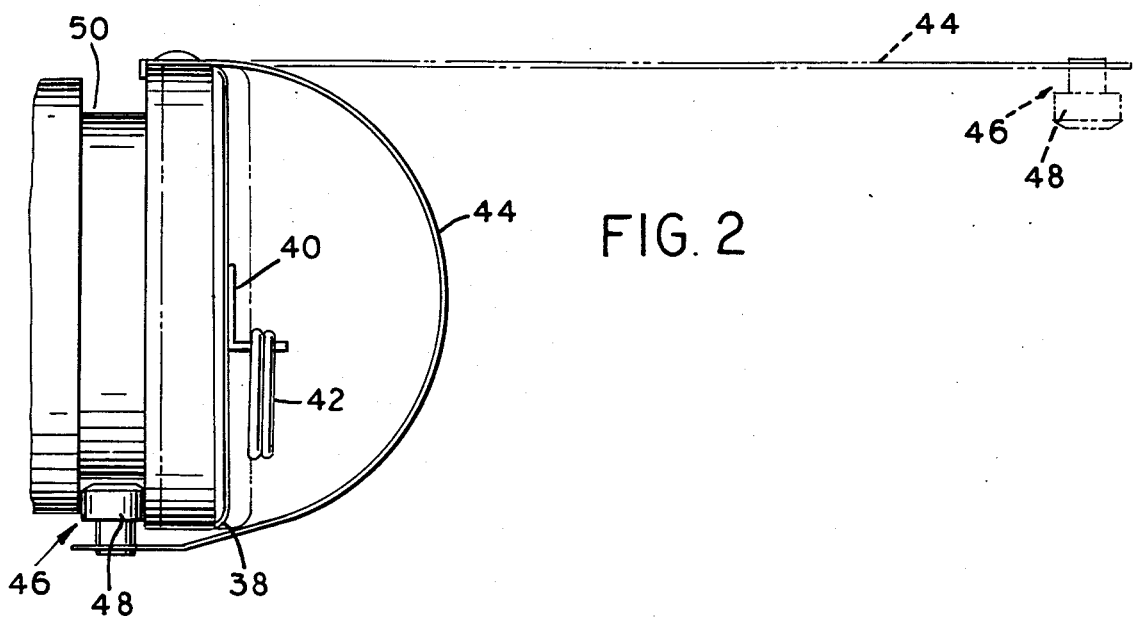

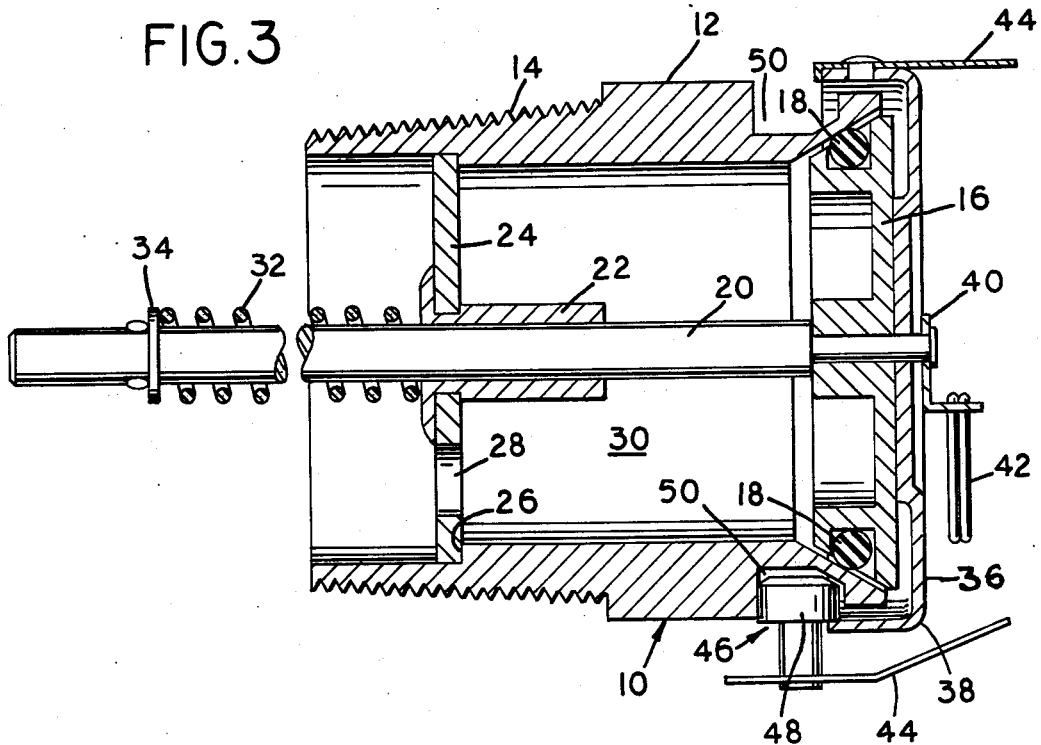

PRESSURE RELIEF VALVE OPERATION SIGNAL

BACKGROUND OF THE INVENTION

This invention relates to the art of pressure relief valves and more particularly to an indicator which signals when a pressure relief valve has operated.

In transformers or voltage regulators which utilize a pressure relief device to limit maximum internal pressure, such equipment is normally unattended. Since the relief valves on such equipment generally automatically reset after excessive internal pressure is relieved, there is no way to warn that a predetermined maximum internal pressure has occurred.

The device of the present invention will indicate when the relief valve has operated, thus providing a means to warn maintenance personnel when corrective action is to be taken to avoid damage to an expensive transformer or voltage regulator.

An object of this invention is to provide a means to warn the internal pressure of an enclosure has exceeded a predetermined value.

Another object is to provide a means for use in indicating when a pressure relief valve has operated, even if the pressure relief valve automatically returns to operational condition.

Still another object is to provide a pressure relief operation indicator device which is of simple structure, reliable in operation, and which can be easily rest for use as often as required.

BRIEF DESCRIPTION OF THE DRAWING

These and further objects and features of the invention will become apparent from the following description and accompanying drawings wherein:

FIG. 1 is a perspective view of a pressure relief valve incorporating the indicator means of the invention and showing the indicator in preset condition;

FIG. 2 is an enlarged side view of the same illustrating the indicator in preset condition, and showing in phantom lines the indicator in operated position; and FIG. 3 is an enlarged view as seen from line 3—3 in FIG. 1.

DESCRIPTION OF A PREFERRED EMBODIMENT OF THE INVENTION

Referring now to FIGS. 1 and 3 of the drawings, numeral 10 indicates a pressure relief valve, having an adaptor or a body portion 12, with a threaded end 14 for screwing into an opening in a pressure vessel (not shown) such as a transformer or voltage regulator. A plunger 16 arranged at one end of the adaptor 12 is movable into sealing engagement with the end of the adaptor by virtue of an "O" ring 18. The plunger is affixed to an axial shaft 20 which is supported for movement in a bearing 22 secured to a support 24 seated in abutment with a shoulder 26 formed in the adaptor 12. The support 24 has a plurality of holes 28 which permits flow of pressure fluid, i.e., hydraulic or pneumatic as the case may be, into a chamber 30 defined between the support 24 and the plunger 16. It will be appreciated that the pressure in the chamber 30 will be the same as the internal pressure of the device, e.g., transformer, to which the pressure relief valve is affixed. A spring 32 surrounding the shaft 20, is compressively maintained between the support 24 and an abutment ring 34 affixed to the shaft at an extremity thereof. Spring pressure can be set to resist unseating of the plunger until a predetermined pressure has been realized in the transformer. A shield 36, secured to the outside of the plunger, has a cupped end 38 surrounding the plunger 16. A bracket 40 is affixed to the outer side of the plunger 16 and has a pull ring 42 affixed thereto. The pull ringmay be used for manual operation, i.e., unseating of the plunger to evacuate the chamber 30 by maintenance personnel when desired.

The foregoing represents a type of pressure relief valve known in the prior art. The improvement therein as represented by the subject invention relates to a flexure element in the form of a flat elongated spring 44, one end of which is affixed to the relief valve, preferably to a cupped end 38 of the shield 36, the other end of which has secured thereto a trigger means in the form of a stud 46. The stud has an enlargement 48 which is arranged for positioning in a peripheral groove 50 formed in the body portion 12 of the relief valve. The stud enlargement 48 is positionally maintained in the groove 50 by engagement with the inner surface of the cupped end 38 of the shield 36.

When the plunger 16 is moved from seated position in the body portion 12, the cupped end 38 of the shield 36 will move out of holding engagement with the stud enlargement 48 whereupon the spring will be released to assume an upright or unflexed position, as best seen in FIG. 2. In such position, the spring 44 will indicate that the relief valve has operated, i.e., the pressure in chamber 30 has exceeded a predetermined value. Maintenance personnel will thus be afforded a warning signal so that the condition of the equipment having the relief valve can be investigated and corrective action taken if required. To facilitate observation of the spring 44 in warning position, it maybe brightly colored.

Once the equipment is investigated by a maintenance man having observed the spring 44 in warning position, it may be easily reset, if desired, by simply reflexing the spring so that the stud enlargement 48 is positioned in the groove 50 and maintained in such position by the cupped end 38 of the shield 36.

It should be apparent that the relief valve operation indicator will satisfy all of the objections of the invention as hereinbefore set forth.

While an embodiment of the invention has been illustrated and described in detail, it is to be expressly understood that the invention is not limited thereto. Various changes in form, design or arrangement may be made in its parts without departing from the spirit and scope of the invention; it is my intention, therefore, to claim the invention not only as shown and described, but also in all such forms and modifications thereof as might be reasonably construed to be within the spirit of the invention and the scope of the appended claims.

I claim:

1. A pressure relief valve operation signal for use on a valve having a body portion adapted to be secured to a pressure vessel, a plunger which is spring biased into seating engagement with an end of the body portion to maintain pressure in the vessel, and a shield secured to an exterior portion of the plunger, said operation signal comprising a flexure element in the form of an elongated flat spring one end of which is secured to the shield the other end of the flexure element being provided with a stud having an end positionable in a peripheral groove formed in the body portion, said stud being maintained in said groove by engagement by the shield and being free to move out of said groove when the shield is moved with the plunger as the latter is unseated from the end of the body portion.

2. A pressure relief valve operation signal according to claim 1, wherein a pull ring is secured to the shield whereby the shield may be moved to allow positioning of the stud in the peripheral groove.

* * * * *